(12) United States Patent
Mochizuki

(10) Patent No.: US 6,769,617 B2
(45) Date of Patent: Aug. 3, 2004

(54) IMAGE FORMING APPARATUS AND IMAGE FORMING METHOD

(75) Inventor: Yasuyuki Mochizuki, Kanagawa (JP)

(73) Assignee: Fuji Photo Film, Co., Ltd., Kanagawa (JP)

(*) Notice: Subject to any disclaimer, the term of this patent is extended or adjusted under 35 U.S.C. 154(b) by 0 days.

(21) Appl. No.: 09/899,817

(22) Filed: Jul. 9, 2001

(65) Prior Publication Data

US 2002/0024651 A1 Feb. 28, 2002

(30) Foreign Application Priority Data

Jul. 7, 2000 (JP) ........................................ 2000-206369

(51) Int. Cl.[7] .................................................. G06K 7/10
(52) U.S. Cl. ............... 235/462.14; 235/375; 235/462.08; 235/435; 235/462.27; 355/40
(58) Field of Search ............................. 235/375, 462.14, 235/462.8, 462.27, 435; 355/40

(56) References Cited

U.S. PATENT DOCUMENTS

| | | | | |
|---|---|---|---|---|
| 4,652,733 A | * | 3/1987 | Eng et al. | 235/375 |
| 4,797,946 A | * | 1/1989 | Katsuta et al. | 235/375 |
| 5,126,540 A | * | 6/1992 | Kashiwagi et al. | 235/375 |
| 5,155,341 A | * | 10/1992 | Ohtani et al. | 235/375 |
| 5,321,523 A | * | 6/1994 | Hashimoto | 358/3.21 |
| 5,886,774 A | * | 3/1999 | Nishida et al. | 355/40 |
| 5,936,709 A | * | 8/1999 | Yamamoto | 355/40 |
| 5,940,168 A | * | 8/1999 | Ishii | 355/40 |
| 6,072,916 A | * | 6/2000 | Suzuki | 358/296 |
| 6,342,957 B1 | * | 1/2002 | Itoh | 358/401 |
| 6,347,162 B1 | * | 2/2002 | Suzuki | 358/296 |
| 6,430,376 B1 | * | 8/2002 | Yamamoto | 396/429 |
| 6,459,500 B1 | * | 10/2002 | Takaoka | 358/1.9 |

FOREIGN PATENT DOCUMENTS

| | | | | |
|---|---|---|---|---|
| JP | 10-117262 | 5/1998 | ............ | H04N/1/00 |
| JP | 11-234514 | 8/1999 | ............ | H04N/1/40 |

OTHER PUBLICATIONS

Patent Abstract of Japan, 10–117262, May 6, 1998.
Patent Abstract of Japan, 11–234514, Aug. 27, 1999.

* cited by examiner

Primary Examiner—Michael G. Lee
Assistant Examiner—Steven S. Paik
(74) Attorney, Agent, or Firm—Sughrue Mion, PLLC

(57) ABSTRACT

The image forming apparatus and method subject image data to predetermined image processing to obtain processed image data and execute both of outputting a print according to the processed image data and outputting the processed image data to an image file. The apparatus and method create information for identifying an original before an image of the original is read to input the image data and storing the original identifying information in a data base in relation to the image file, read out, when a reprint is requested by designating the original identifying information, predetermined processed image data from the image file of the data base based on the original identifying information and output the print according to the predetermined processed image data. As a result, the apparatus and method are capable of easily designating a corresponding image file when a reprint is requested and capable of easily outputting the reprint from the image file without the need of an original film.

19 Claims, 3 Drawing Sheets

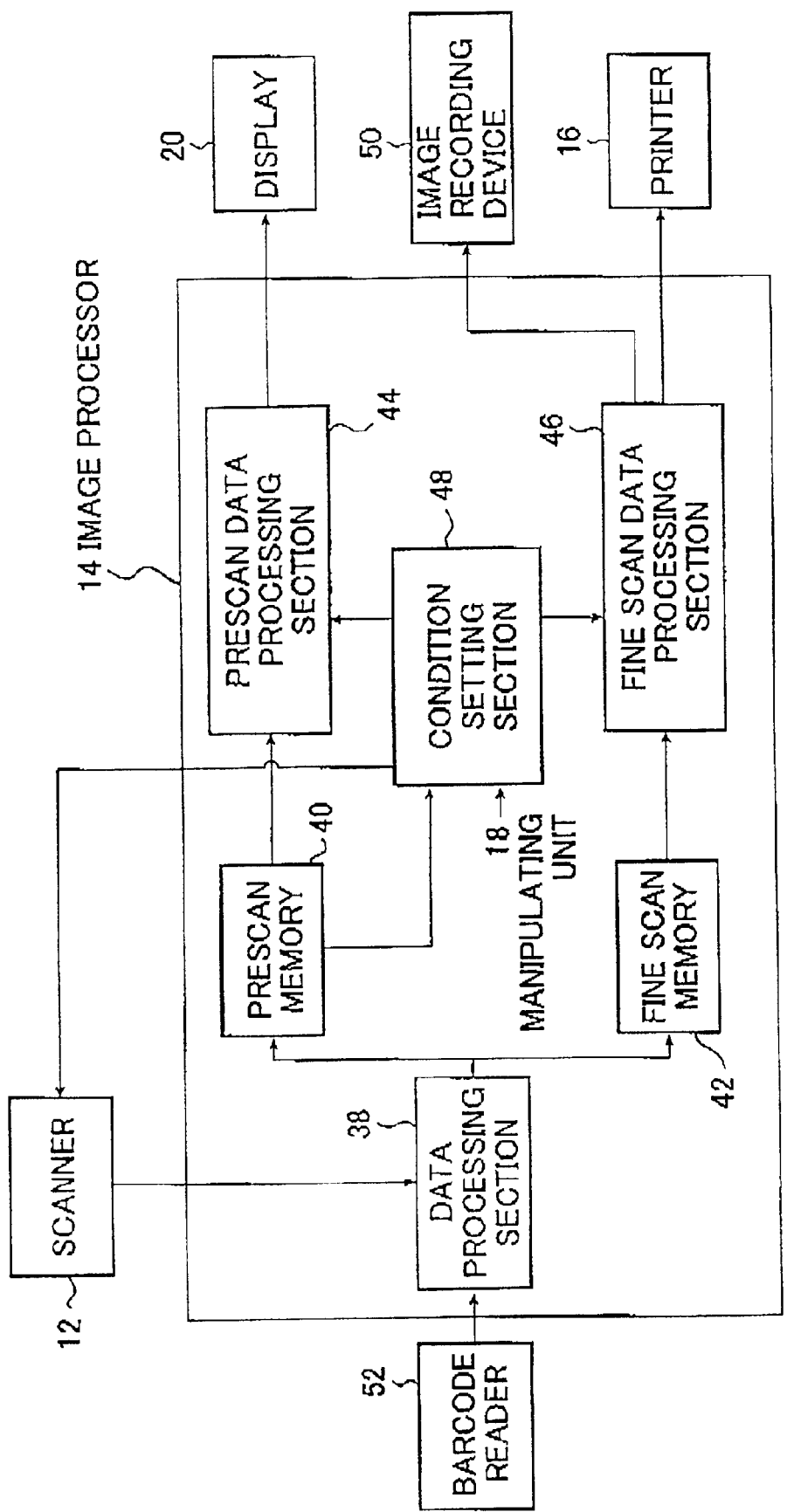

IMAGE FORMING APPARATUS AND IMAGE FORMING METHOD

BACKGROUND OF THE INVENTION

1. Field of the Invention

The present invention relates to an image forming apparatus and an image forming method for reading an image of an original, subjecting the read image to predetermined image processing, and outputting a print on which the image is reproduced as well as recording the image data of the image on a recording medium.

2. Description of the Related Art

Most of the images recorded on photographic films such as negative films and reversal films (which are hereinafter referred to as "films") are conventionally printed onto light-sensitive materials (photographic papers) by a technique generally called "direct exposure" in which an image on a film is projected onto the light-sensitive material for areal exposure.

A printer that adopts digital exposure has recently been commercialized. In this "digital photoprinter", an image recorded on a film is read photoelectronically and converted into digital signals, which are subjected to various kinds of image processing to produce recording image data; a light-sensitive material is exposed by scanning with recording light modulated in accordance with the image data, thereby recording a (latent) image to produce a (finished) print therefrom.

The digital photoprinter is composed of the following basic components; a scanner (image reading apparatus) which makes reading light incident on a film and reads the light projected therefrom, thereby photoelectronically reading the image recorded on the film; an image processing apparatus which performs predetermined processing to the image data read with the scanner and to the image data supplied from a digital camera and the like to obtain image data for recording the image (exposing conditions); a printer (image recording apparatus) which scan exposes a light-sensitive material with, for example, a light beam in accordance with the image data supplied from the image processing apparatus and records a latent image; and a processor (developing apparatus) which subjects the light-sensitive material exposed by the printer to development processing and produces a (finished) print on which the image is reproduced.

According to this digital photoprinter, since an image can be appropriately processed by processing image data, it is preferably subjected to gradation adjustment, color balance adjustment, color/density adjustment, and the like. Accordingly, a print of high quality that cannot be obtained by conventional direct exposure can be obtained.

Further, since an image is handled as digital image data, not only an image recorded on a film but also an image recorded by a digital camera and the like and an image obtained through a communication network such as the Internet and the like can be outputted as a print.

Further, since an image is handled as digital image data, not only the image can be outputted as a photographic print but also image data (image file) of the image reproduced on the photographic print can be outputted to various types of recording media such as a CD-R, an MO (magneto-optical recording medium) and the like. Thus, it is possible to provide both of the photographic print and the image file (recording medium on which the image file is recorded) in accordance with a request of a customer (person who requests to produce a print).

The applicant has disclosed image processing apparatuses (image recording apparatuses) capable of outputting both of the photographic print and the image file as described above in Japanese Unexamined Patent Application Publications Nos. 10-117262, 11-234514, and so on. According to the apparatuses disclosed in these publications, it is possible to output both of the photographic print and the image file and to present them to a customer. Further, according to a digital photoprinter using these apparatuses, it is possible to produce extra prints even if a negative film and the like used as an original are not available because not only an image can be outputted as a print but also the image data of the image can be recorded and stored in a recording medium such as a floppy disk and the like.

Even if an original film is not available when a reprint of an image is requested, conventional apparatuses are capable of producing the reprint from an image file by storing the image data of the image as the image file which enables the request for reprinting without the original film, while at the same time reading the original to produce a print. However, since it is not so easy to designate an image file corresponding to an image the reprint of which is requested, there has been desired a simpler method of designating an image file when a reprint is requested.

An object of the present invention, which was made in view of the above conventional problems, is to provide an image forming apparatus and an image forming method capable of easily designating a corresponding image file when a reprint is requested and capable of easily outputting the reprint from the image file without the need of an original film.

In order to attain the object described above, the first aspect of the present invention provides an image forming apparatus comprising: a reading device for photoelectrically reading an image of an original to obtain digital image data; an image processor for subjecting the digital image data to predetermined image processing to obtain processed image data; a printer for outputting a print according to the processed image data; and an image recording device for outputting the image processed data to an image file; wherein both of outputting the print with the printer and outputting the image file with the image recording device; further comprising: an original identifying information input device for inputting information for identifying the original before the original is read; and a data base for storing the inputted original identifying information in relation to the image file.

Preferably, the original identifying information input device is a bar code reader.

Preferably, the original identifying information input device is the reading device for photoelectrically reading the original, and an identifier having a marker attached thereto, which shows information for identifying the original and can be photoelectrically read, is disposed to an extreme end of the original, and the marker is read by the reading device at the same time the image of the original is read.

Preferably, the original identifying information input device is the reading device for photoelectrically reading the original and further comprises a unit for magnetically reading information, an identifier having a marker attached thereto, which shows information for identifying the original and can be magnetically read, is disposed to an extreme end of the original, and the marker is read by the reading device at the same time the image of the original is read.

Preferably, the original identifying information input device is a device through which an operator inputs information for identifying the original as a character string.

Preferably, the data base stores information for identifying the image forming apparatus or the laboratory where the image forming apparatus is installed together with the image file and the information for identifying the original.

It is preferable that the image forming apparatus further comprises: a print device for back printing the information for identifying the original on the print.

It is also preferable that the image forming apparatus further comprises: a print device for printing the information for identifying the original on the index print.

In order to attain the object described above, the second aspect of the present invention provides an image forming method comprising the steps of: subjecting image data to predetermined image processing to obtain processed image data; and executing both of outputting a print according to the processed image data and outputting the processed image data to an image file; further comprising the steps of: creating information for identifying an original before an image of the original is read to input the image data and storing the original identifying information in a data base in relation to the image file; reading out, when a reprint is requested by designating the original identifying information, predetermined processed image data from the image file of the data base based on the original identifying information; and outputting the print according to the predetermined processed image data.

BRIEF DESCRIPTION OF THE DRAWINGS

FIG. 2 is a block diagram showing the outline of an image processor of FIG. 1.

DESCRIPTION OF THE PREFERRED EMBODIMENT

An image forming apparatus and an image forming method of the present invention will be described below in detail with reference to a preferable embodiment shown in the accompanying drawings.

Figure 1:
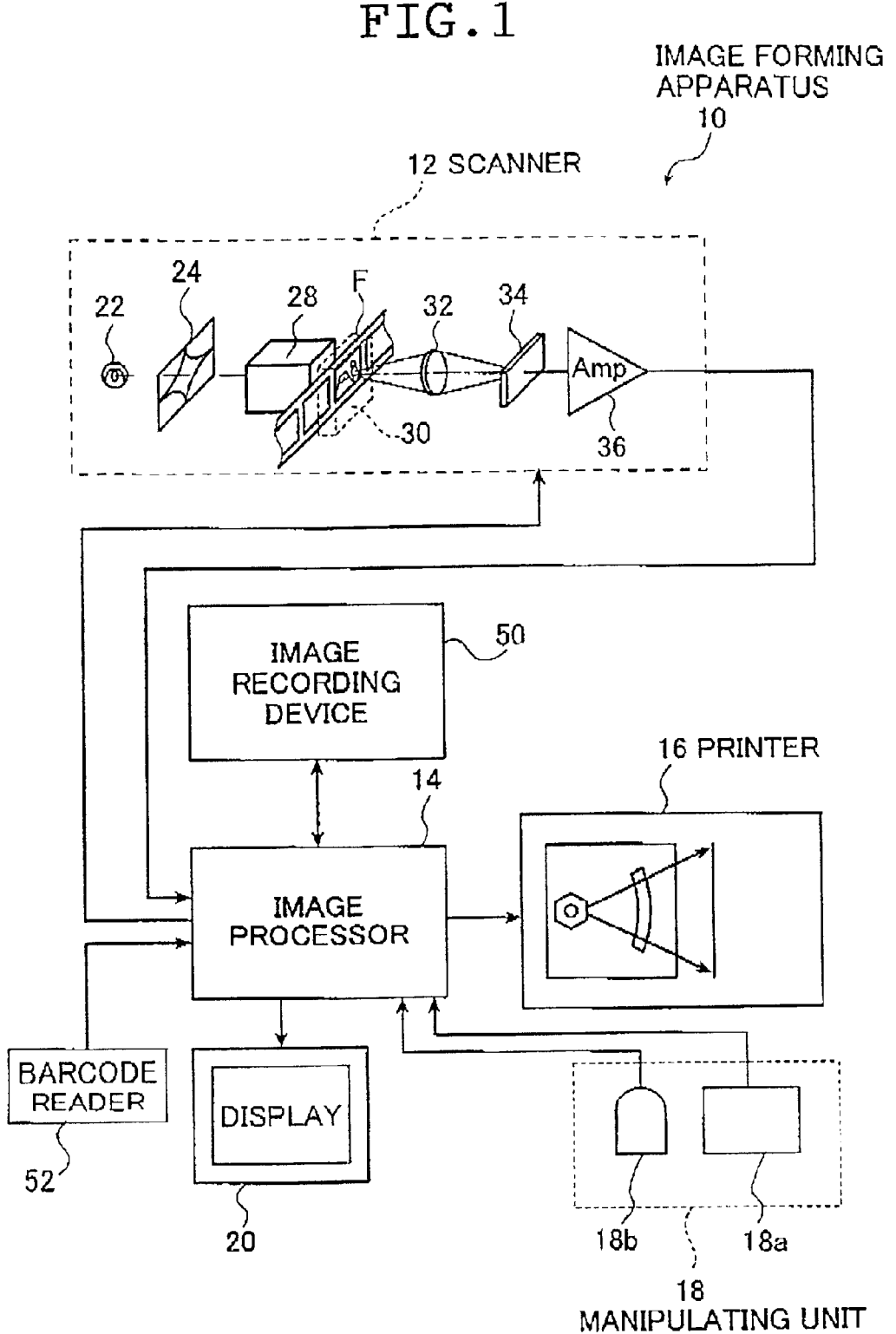
FIG. 1 is a block diagram showing the schematic arrangement of an image forming apparatus according to an embodiment of the present invention.

FIG. 1 is a block diagram showing the schematic arrangement of an image forming apparatus according to an embodiment of the present invention.

The image forming apparatus 10 shown in FIG. 1 basically comprises a scanner 12 for photoelectrically reading an image recorded on a film F, an image processor 14 for processing the image data of the image having been read and for executing the manipulation, control and the like of the image forming apparatus 10 in its entirety, and a printer 16 for exposing a light-sensitive material (photographic paper) with light beams modulated in accordance with the image data delivered from the image processor 14 and subjecting the light-sensitive material to development processing thereby outputting as a (finished) print.

Further, connected to the image processor 14 are a manipulating unit 18 having a keyboard 18a and a mouse 18b to enter (set) various conditions, to select and issue a command for a specific processing step and to enter commands for color/density correction and the like, a display 20 which displays the image read with the scanner 12, various kinds of manipulative instructions, screens on which various conditions are set and registered, and the like, an image recording device 50 having a database for storing original identifying information in relation to an image file, and a barcode reader 52 for reading the original identifying information represented by a barcode.

The scanner 12 is a device with which the images recorded on a film F or the like are read photoelectrically frame by frame, and includes a light source 22, a variable diaphragm 24, a diffuser box 28 with which the reading light incident on the film F is made uniform on the plane thereof, an imaging lens unit 32, an image sensor 34 having line CCD sensors corresponding to the reading of respective R (red), G (green), and B (blue) images, and an amplifier 36.

Further, in the image forming apparatus 10, dedicated carriers are prepared which can be mounted on the main body of the scanner 12 in accordance with the types of films such as a film used in the Advanced Photo System, a 135-sized negative (or reversal) film, etc., the forms of films such as a strip, a slide, etc., and the various types of the films can be handled by the replacement of the carriers.

An image recorded in a frame of a film and used to produce a print is transported to a predetermined reading position by the carrier.

In the scanner 12 described above, when the images recorded on the film F are read, the reading light emitted from the light source 22 with its quality of light adjusted by the variable diaphragm 24 is incident on the film F located at the predetermined reading position by the carrier 30 and passes therethrough, whereby projected light carrying the images recorded on the film F can be obtained.

The carrier 30 transports the film F with the lengthwise direction of the film F being in coincidence with an auxiliary scanning direction perpendicular to the direction in which the line CCD sensors of the image sensor 34 extend (main scanning direction) while locating the film F at the predetermined reading position. The images recorded on the respective frames of the film F are read in such a manner that the film F is transported in the auxiliary scanning direction by the carrier 30 while being located at the reading position and two-dimensionally slit scanned with the reading light incident thereon.

Further, as known well, a magnetic recording medium is formed on the film of the Advanced Photo System, and various types of information such as a type of a film, a photographing date, presence or absence of light emitted from an electronic flash, a title, and the like are recorded on the magnetic recording medium. A carrier corresponding to the Advanced Photo System is provided with a magnetic head for recording necessary information on the magnetic reading medium and for reading out information recorded thereon. Various types of information read out by the magnetic head are sent to predetermined sections such as the image processor 14, and the like, when necessary.

As described above, the reading light passes through the film F held by the carrier 30 and becomes projected light carrying the images, and then the projected light is imaged on the light receiving surface of the image sensor 34 by the imaging lens unit 32.

The image sensor 34 is a so-called three-line color CCD sensor having three line CCD sensors for reading an R image, a G image and a B image, respectively, and each line sensor extends in the main scanning direction as described above. The projected light from the film F is separated into the three R, G, and B primary colors by the image sensor 34 and photoelectrically read.

The signals outputted from the image sensor 34 are amplified by the amplifier 36 and sent to the image processor 14.

In the scanner 12, the images recorded on the film F are captured by two scans, the first being prescan for reading the images at a low resolution and the second to be executed thereafter being fine scan for obtaining output image data.

The prescan is carried out under preset prescan reading conditions which ensure that all the images of the film F to be handled by the scanner 12 can be read without saturating the image sensor 34.

The reading conditions for each frame in the fine scan are set such that the image sensor 34 is saturated at a density which is somewhat lower than the minimum density of each image (frame) using the image data (prescanned data) obtained by the prescan.

Therefore, the output signal of the prescan is different from that of the fine scan in a pixel density and signal intensity.

It should be noted that when images are read with the scanner acting as an image data supply source, the scanning is by no means limited to a type that relies upon the slit scan exposure described above but that areal exposure may be employed by which the image on the entire surface of one frame is read at a time. In this case, an area CCD sensor, for example, is employed, a device for inserting R, G, and B color filters is interposed between the light source and the film F. and an image recorded on the film F is read with the area CCD sensor by sequentially inserting the R, G, and B color filters so that the image is read after it is separated into the three primary colors.

In addition to the scanner for reading a film as described above, exemplary preferable image data supply sources include an image reading apparatus for reading the image of a reflection original, an image recording device such as a digital camera, a digital video camera, etc., a communication network such as a LAN (local area network), a computer communication network or the like, a medium (recording medium) such as a memory card, an MO (magneto-optical recording medium), etc.

As described above, the digital signals outputted from the scanner 12 are supplied to the image processor 14 (hereinafter, abbreviated as processor 14).

FIG. 2 shows a block diagram of the processor 14. The processor 14 converts the signals outputted from the scanner 12 to digital image data, subjects the image data to predetermined image processing to produce output image data, and supplies the output image data to the printer 16 and to the database (image recording device 50). The processor 14 mainly comprises a data processing section 38, a prescan (frame) memory 40, a fine scan (frame) memory 42, a prescan data processing section 44, a fine scan data processing section 46, and a condition setting section 48.

Note that FIG. 2 mainly shows only the sections which are related to the image processing. However, the processor 14 is provided with a CPU for controlling and managing the image forming apparatus 10 including the processor 14 in its entirety, a memory for storing information necessary to the operation and the like of the image forming apparatus 10, and the like, in addition to the above sections. Further, the manipulating unit 18 and the display 20 are connected to respective sections through the CPU and the like (CPU bus).

The respective R, G, and B digital signals outputted from the scanner 12 are subjected to predetermined data processing in the data processing section 38 such as A/D conversion (analog to digital conversion), Log conversion (gradation conversion), darkness correction, defective pixel correction, DC offset correction, shading correction, and the like to be converted into the digital image data. Prescan (image) data is stored in the prescan memory 40 and fine scan (image) data is stored in the fine scan memory 42, respectively. Note that the signals outputted from the scanner 12 in the prescan and the the fine scan are basically the same data except for the pixel density and the output level.

The prescan data recorded in the prescan memory 40 is processed in the prescan data processing section 44, and the fine scan data recorded in the fine scan memory 42 is processed in the fine scan data processing section 46, respectively.

The prescan data processing section 44 and the fine scan data processing section 46 subject the respective pieces of the image data to predetermined image processing according to the image processing conditions which have been set by the condition setting section 48 based on the prescan data. Processing carried out in these processing sections 44 and 46 is basically the same except for the image data resolution. The condition setting section 48 sets the reading conditions in the fine scan and the various types of processing conditions in the prescan and fine scan data processing sections 44 and 46.

The image data having been processed in the prescan data processing section 44 is subjected to predetermined conversion and displayed on the display 20. Further, the image data having been processed in the fine scan data processing section 46 is subjected to predetermined conversion, sent to the printer 16 and outputted as a finished print as well as subjected to predetermined conversion and outputted to the image recording device 50. The image recording device 50 outputs the image data to a predetermined recording medium (image file). In addition to this, the image recording device 50 records and stores the image data in the database provided therein together with original identifying information which is related to an image file to which the image data is outputted.

The present invention will be described below in detail through the description of the operation of this embodiment.

When a customer brings a film (original) on which images have been recorded, to a laboratory and requests to produce prints, necessary items such as the name of the customer, and the like are written on a print order bag (so-called DP bag) 60, as shown in FIG. 5A. In addition, a identifier (check tape) 62 is pasted to the DP bag 60, the check tape 62 having a marker represented by cords such as numerals and so on and bar cords through which information for identifying the original can be optically read. When the original is a film, the original identifying information identifies the original in a unit of film. When a print from a digital camera and the like is requested, identification is to be made for each one request. The print order bag 60 is returned to the customer later together with finished prints and a negative film (original) packed therein.

Figure 3A:
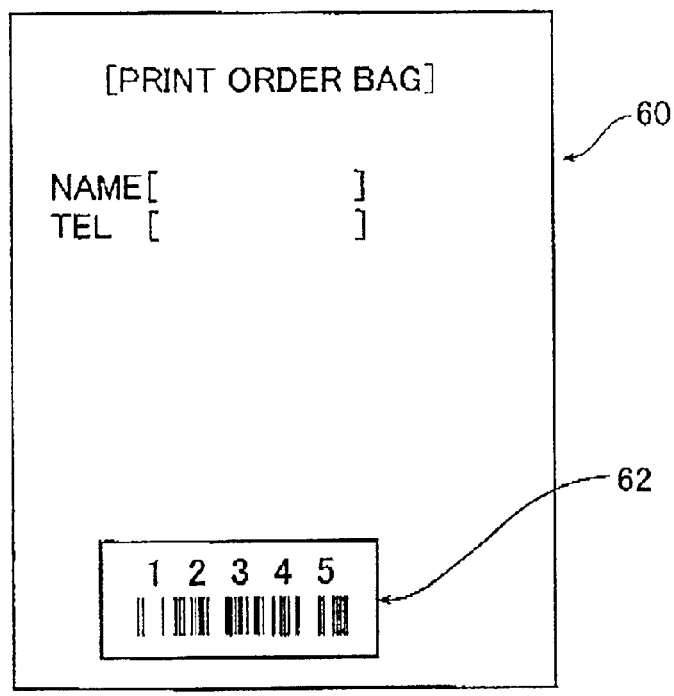
FIG. 3A is a view explaining an example of an order bag.
Figure 3B:
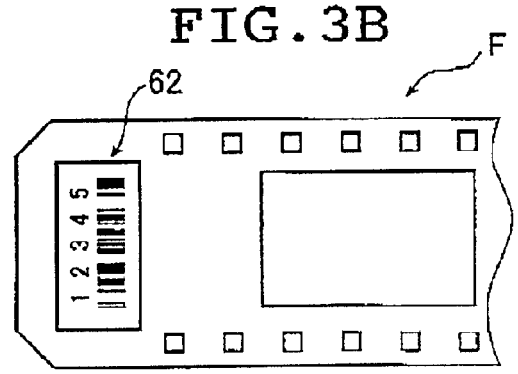
FIG. 3B is a view explaining a state of an original film in which a check tape, which can be optically read, is pasted to an extreme end of an original film.

A tape similar to the check tape 62 representing the above original identifying information is also pasted to an extreme end of the film (original) F as shown in FIG. 3B. This arrangement prevents the occurrence of such a situation that the film (original) F is separated from the DP bag 60 and cannot be made to correspond to the DP bag 60.

When processing is carried out in the laboratory having received the request, an operator inputs the original identifying information by reading the bar code of the check tape 62 on the DP bag 60 with the bar code reader 52 before he or she reads the original with the scanner 12.

Next, the operator places the film F onto the carrier 30 and reads the film F with the scanner 12 in the sequence of frames. At this time, first, light is irradiated to the check tape 62 pasted to the extreme end of the film F and the reflected light therefrom is received by the image sensor 34 so that the original identifying information is read. With this operation, the original can be confirmed.

Figure 3C:
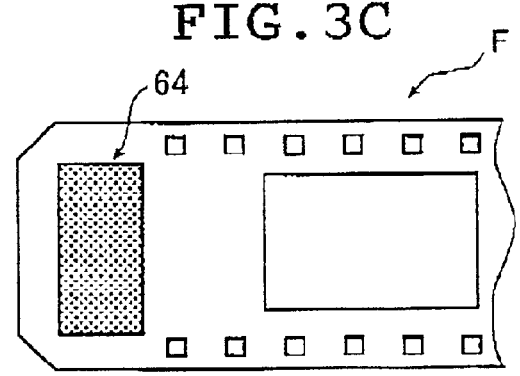
FIG. 3C is a view explaining a state of an original film in which a check tape, which can be magnetically read, is pasted to an extreme end of an original film.

It should be noted that the method for inputting the original identifying information is not limited to the optical reading from the check tape 62, and, as shown in, for example, FIG. 3C, a check tape 64 which includes magnetic information representing the original identifying information may be pasted to the extreme end of the film F and magnetically read, when the film F is read with a magnetic information reading unit provided in the scanner 12.

Otherwise, the operator may input the original identifying information as a character string from the keyboard 18a. This arrangement is preferable when an image of an original is inputted from a digital camera.

Thereafter, prescan and fine scan are carried out, fine scan data is subjected Go predetermined image processing which has been set by the condition setting section 48 based on the prescan data, and image data having been processed is converted into print output data and outputted from the printer 16 as a finished print.

Further, at this time, the output image data is also converted into output image data for use in image file, which is then outputted to the image recording device 50 and supplied to a predetermined recording medium. The recording medium is not particularly limited, and, known recording media including magnetic recording media such as a floppy disc, a removable hard disc (Zip, Jaz, etc.) and a DAT (digital audio tape); magneto-optical recording media such as an MO (magneto-optical) disc, an MD (mini-disk) and a DVD (digital video disc); and card memories such as a PC card and Smartmedia can be utilized.

Further, the image recording device 50 records and stores the image data and the original identifying information related to the image file in the data base of the image recording device 50.

The finished prints and the negative film are returned to the customer by being packed in the DP bag 60. The check tape including the original identifying information is pasted on the order bag, whereas the original identifying information is stored in relation to the image file. Accordingly, the customer can simply request a reprint without a film acting as an original because the image file can be simply specified in such a manner that the customer brings the order bag to the laboratory or designates an original identification number.

Further, the printer 16 may be provided with a back print unit (not shown) and the original identifying information may be back printed. Otherwise the printer 16 may be provided with a print unit (not shown) and the original identifying information may be printed on an index print, or the original identifying information may be printed on the index print by the printer 16 simultaneously with the preparation of the index print.

Further, the information which identifies the image forming apparatus by which the prints were produced or identifies the laboratory where the image forming apparatus was installed, may be stored together with the original identifying information. The storage of the information for identifying the image forming apparatus has such an advantage that when a plurality of image forming apparatuses are installed in one laboratory, it is possible to confirm the image forming apparatus by which particular prints were produced. Further, the storage of the laboratory identifying information has such an advantage that when a plurality of laboratories are operated as a chain and connected to each other through a network, the laboratories can exchange data with each other for the service of customers.

As described above in detail, according to this embodiment, since information for identifying an original is inputted and stored in relation to an image file before image data is obtained by reading an image with a scanner, a corresponding image file can be simply designated when a reprint is requested, which permits the reprint to be simply produced from the image file without a film. Accordingly, a procedure for requesting a reprint can be very simple.

While the image forming apparatus and the image forming method of the present invention have been described above in detail, the present invention is by no means limited to the above embodiment and it goes without saying that various improvements and modifications can be made within the range which does not depart from the gist of the present invention.

As described above, according to the present invention, when a reprint is requested, a corresponding image file can be simply designated so that the reprint can be simply outputted from the image file without an original film.

What is claimed is:

1. An image forming apparatus comprising:
    a reading device for photoelectrically reading an image of an original to obtain digital image data;
    an image processor for subjecting the digital image data to a predetermined image processing to obtain a processed image data;
    a printer for outputting a print according to the processed image data; and
    an image recording device for outputting the image processed data to an image file; wherein
        both of outputting said print with the printer and outputting said image file with the image recording device are executed;
        further comprising:
            an original identifying information input device for inputting information for identifying the original before the original is read; and
            a data base for storing the inputted original identifying information in relation to the image file.

2. An image forming apparatus according to claim 1, wherein said original identifying information input device is a bar code reader.

3. An image forming apparatus according to claim 1, wherein said original identifying information input device is the reading device for photoelectrically reading the original, and an identifier having a marker attached thereto, which shows information for identifying the original and can be photoelectrically read, is disposed to an extreme end of the original, and the marker is read by the reading device at the same time the image of the original is read.

4. An image forming apparatus according to claim 1, wherein said original identifying information input device is the reading device for photoelectrically reading the original and further comprises a unit for magnetically reading information, an identifier having a marker attached thereto, which shows information for identifying the original and can be magnetically read, is disposed to an extreme end of the original, and the marker is read by the reading device at the same time the image of the original is read.

5. An image forming apparatus according to claim 1, wherein said original identifying information input device is a device through which an operator inputs information for identifying the original, as a character string.

6. An image forming apparatus according to claim 5, wherein said character string is input when said original is from a digital camera.

7. An image forming apparatus according to claim 1, wherein said data base stores information for identifying the image forming apparatus or the laboratory where the image forming apparatus is installed together with the image file and the information for identifying the original.

8. An image forming apparatus according to claim 7, wherein said data base is accessible by at least two laboratories.

9. An image forming apparatus according to claim 8, wherein said laboratories are connected to each other through a network in order to exchange data.

10. An image forming apparatus according to claim 1, further comprising:
a print device for back printing the information for identifying the original on the print.

11. An image forming apparatus according to claim 1, further comprising:
a print device for printing the information for identifying the original on the index print.

12. An image forming apparatus according to claim 1, further comprising a reprint processing device for reprinting an image corresponding to the image file corresponding to the inputted original identifying information, wherein reprinting can be performed without the original.

13. An image forming apparatus according to claim 1, wherein said original identifying information identifies the original in a unit of film or a unit of a digital camera.

14. An image forming apparatus according to claim 1, wherein said original is a roll of photographic film.

15. An image forming apparatus according to claim 1, wherein said original is data from a digital camera.

16. An image forming apparatus according to claim 15, wherein identification is to be made for each one request of a digital camera print.

17. An image forming method comprising the steps of:
subjecting image data to predetermined image processing to obtain processed image data; and
executing both of outputting a print according to the processed image data and outputting the processed image data to an image file;
further comprising the steps of:
creating information for identifying an original before an image of the original is read to input the image data and storing the original identifying information in a data base in relation to the image file;
reading out, when a reprint is requested by designating the original identifying information, predetermined processed image data from the image file of said data base based on the original identifying information; and
outputting the print according to the predetermined processed image data.

18. The method of claim 17, wherein the image data is obtained through image pick up of an original.

19. The method of claim 18, wherein the reprint is performed without reference to said original.

* * * * *